United States Patent [19]

Metzger

[11] 3,977,248

[45] Aug. 31, 1976

[54] LINEARIZING ELEMENTS FOR VARIABLE AREA FLOWMETER

[75] Inventor: Joseph H. Metzger, Warminster, Pa.

[73] Assignee: Fischer & Porter Co., Warminster, Pa.

[22] Filed: Apr. 3, 1975

[21] Appl. No.: 564,668

[52] U.S. Cl. ............................ 73/209; 73/DIG. 5; 73/432 A
[51] Int. Cl.² ................................ G01F 1/24
[58] Field of Search ............. 116/129 D; 73/DIG. 5, 73/272 R, 432 A, 209

[56] References Cited
UNITED STATES PATENTS

| | | | |
|---|---|---|---|
| 2,509,644 | 5/1950 | Kinderman | 73/432 A X |
| 3,094,002 | 6/1963 | Ryan et al. | 73/432 A |
| 3,164,989 | 1/1965 | Busillo et al. | 73/209 |
| 3,315,523 | 4/1967 | Conkling | 73/209 |
| 3,425,279 | 2/1969 | Conkling et al. | 73/209 |

Primary Examiner—Charles A. Ruehl

[57] ABSTRACT

A rotameter system adapted to produce an output indication that is linearly proportional to flow. The primary element of the system includes a float contained in a variable area tube through which flows the fluid to be measured, the float being raised or lowered in the tube as a function of flow rate, and a bar magnet mechanically coupled to the float and axially movable therewith. The secondary element of the system includes a rotatable follower magnet magnetically coupled to the bar magnet and a pointer mounted on the shaft of the follower magnet whereby the pointer sweeps from zero to maximum along a scale as the float travels from its low to its high position. A mass is eccentrically mounted on the shaft of the follower magnet, the position of the mass relative to the shaft axis being adjusted to produce a moment compensating for the non-linear relationship between flow rate and pointer movement.

5 Claims, 7 Drawing Figures

U.S. Patent  Aug. 31, 1976  Sheet 1 of 2  3,977,248
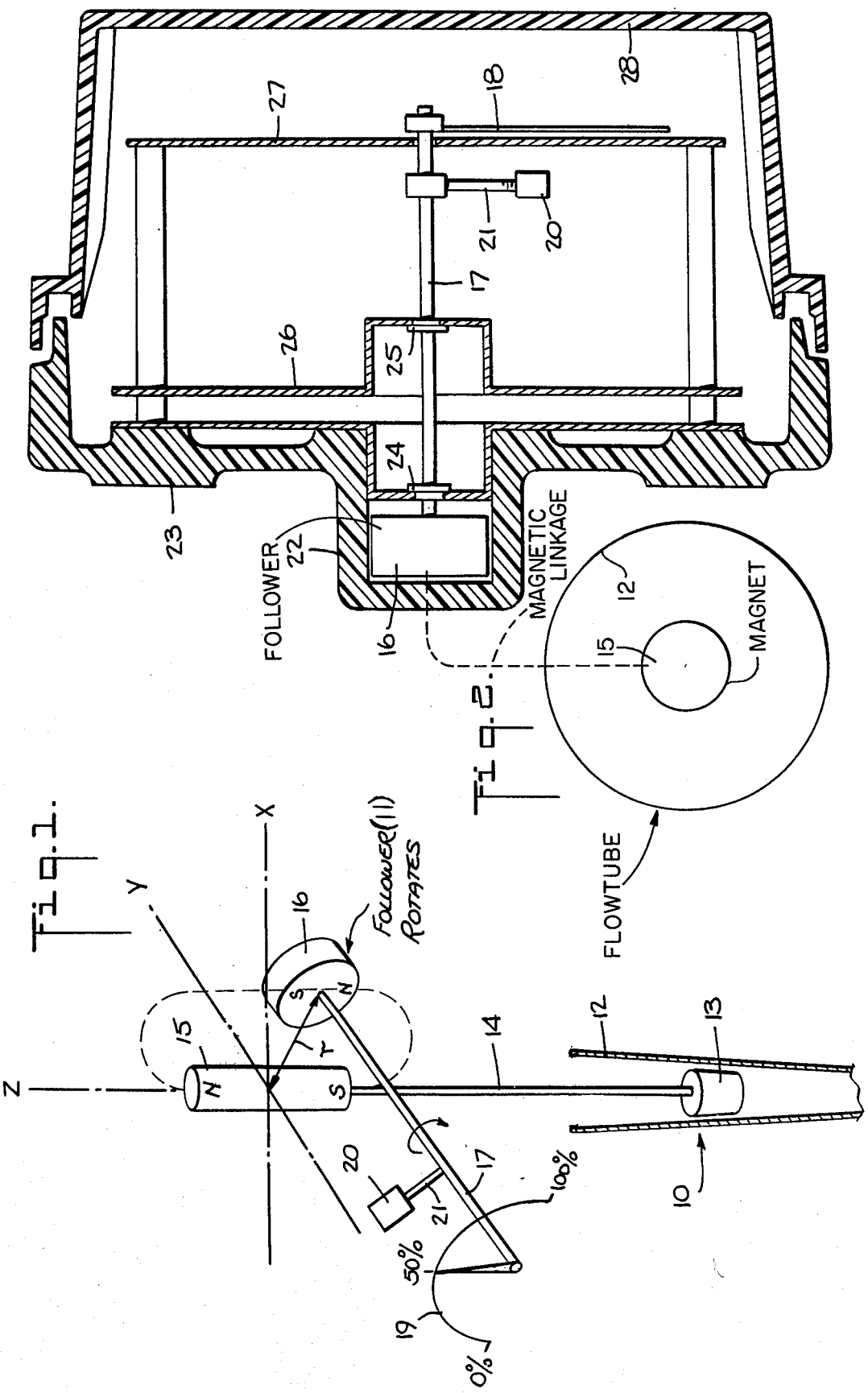

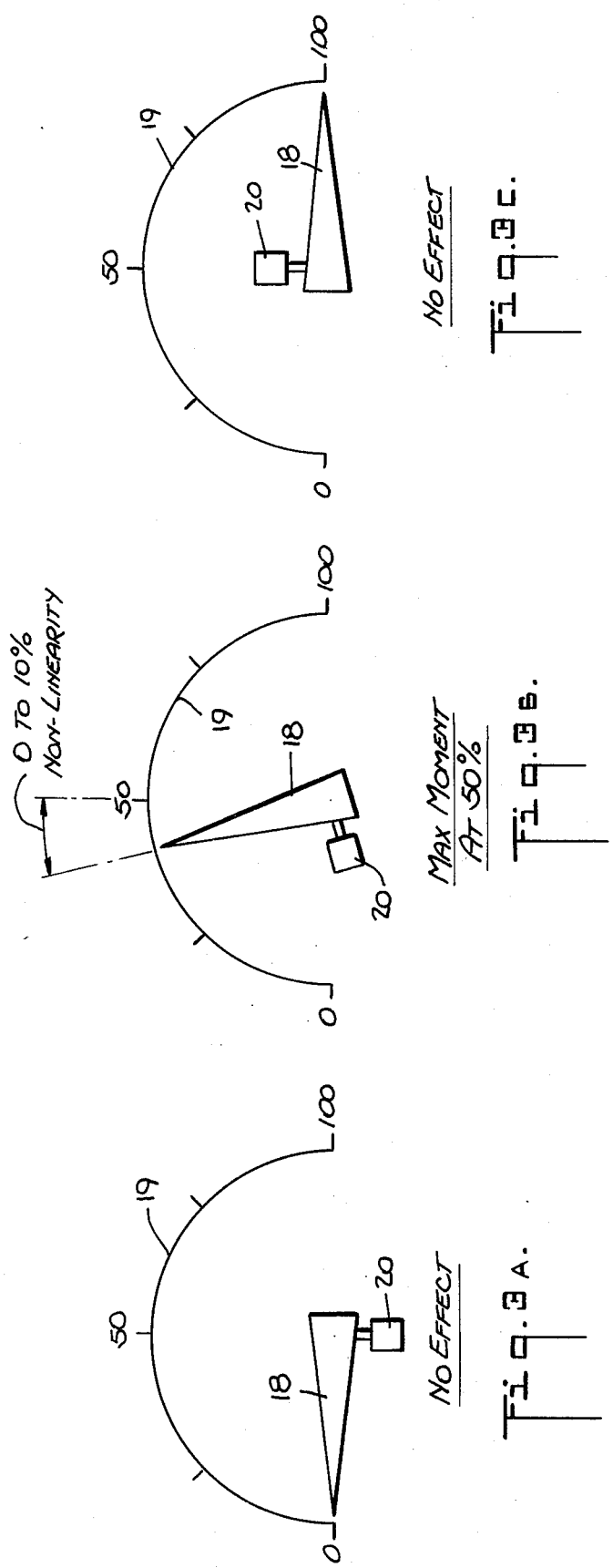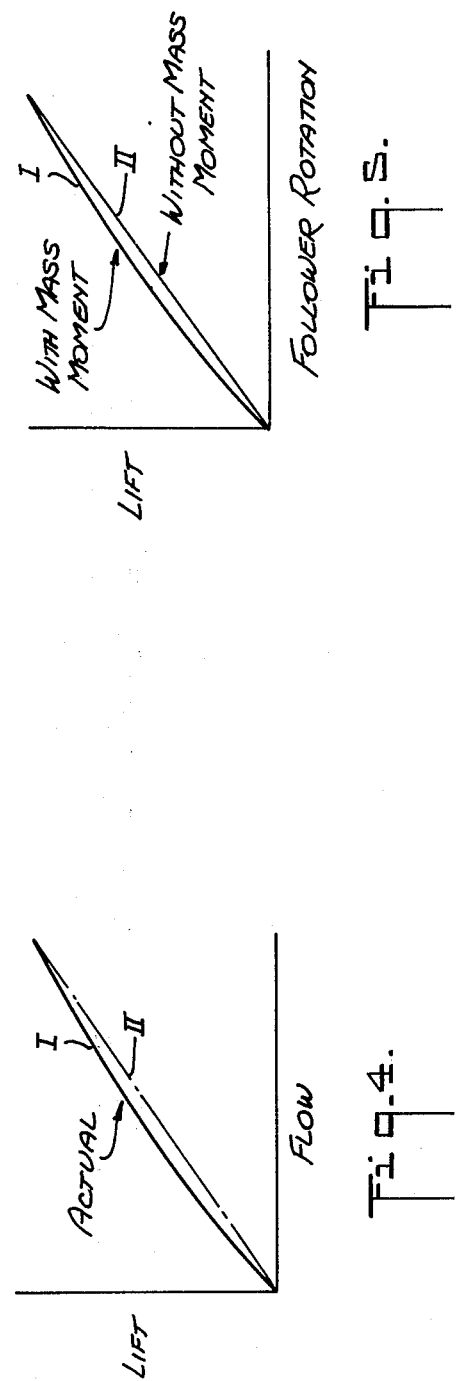

LINEARIZING ELEMENTS FOR VARIABLE AREA FLOWMETER

BACKGROUND OF THE INVENTION

This invention relates generally to flow rate indicators, and more particularly to a magnetic follower mechanism for deriving from the movement of the float in a rotameter an external indication that is linearly proportional to flow rate.

In a variable area meter of rotameter for measuring flow rate, only the orifice area is varied as a function of flow, a constant pressure difference being maintained. The typical rotameter is constituted by an upright, tapered tube containing a weighted float which is raised to a position of equilibrium between the downward force of the float and the upward force of the fluid flowing past the float through the surrounding annular orifice. In a rotameter, the flow restriction is the area of the annular orifice, this area being enlarged as the float rises in the tapered tube. The pressure differential is fixed, this being determined by the weight of the float and the buoyant forces.

The term "rotameter" is derived from the fact that the float was originally designed with slots serving to impart a rotational force thereto for the purpose of centering and stabilizing the float. The present trend, however, is toward guided, non-rotating floats. For visual read-out, the vertical position of the float in the variable area tube is indicated along a calibrated scale etched or otherwise formed along the transparent tube surface.

In many flowmeter applications it is necessary to translate the changing vertical position of the float within the flow tube into a corresponding external indication. Where, for example, the process fluid is opaque, the float cannot be seen through the transparent tube, hence direct visual indication along the tube is precluded. In other situations, the flow tube must be made of metal or other opaque material, so that it is necessary to provide means for registering the float position at a point external to the tube.

Mechanical coupling of the float to an external indicator is generally unsatisfactory, since frictional and other loads thereby imposed on the float interfere with its free motion and distort the flow rate reading. In order to minimize loading the float, it is known to use a magnetic, non-mechanical coupling between the movable float and an external indicator.

Thus both the Conkling U.S. Pat. No. 3,315,523 and the Busillo U.S. Pat. No. 3,164,989 disclose arrangements in which the float in the rotameter tube is provided with a guided extension rod to which a bar magnet is attached, the bar magnet moving up and down in accordance with changes in the vertical float position. The bar magnet cooperates with a rotatable follower magnet mounted at one end of a shaft to which an indicating pointer is attached. The follower magnet is caused to rotate in a direction and to an extent which is a function of the bar magnet movement and hence of flow rate.

The difficulty experienced with magnetic followers of the type heretofore known to that when the hydraulic characteristics of the rotameter are aligned to the follower output by small manipulations of zero and span adjustment, the movement of the float from its minimum to its maximum position is accompanied by an indicator movement having a bowed characteristic that is essentially symmetrical with respect to the 50% flow rate position. In other words, though the lift of the float in the tube has a straight-line relationship to the indication, the float lift exhibits a non-linear or curved relationship to flow rate which takes the form of a bow-shaped curve extending between the extremities of float travel.

In order, therefore, for the indicator to provide an accurate reading of flow rate, one must provide a scale having a non-linear calibration which takes into account the bowed characteristic. While a non-linear scale is generally acceptable in a simple, low-cost flowmeter, it is not satisfactory for indicating transmitters that must produce a linear output reading directly proportional to flow rate.

To overcome this drawback, it has been known to use bias magnets in conjunction with the magnetic follower to compensate for the bowed characteristic thereof, or to use linkages and tailored parts to linearize the follower motion as a function of flow rate. The objection to each of these expedients is that in adjusting the follower to render it linear, this adjustment also affects zero and span, so that it then becomes necessary to readjust zero and span and this in turn throws off the linearity adjustment. In practice, therefore, a series of rather delicate adjustments becomes necessary in order to attain the desired values of zero and span as well as acceptable linearity.

SUMMARY OF INVENTION

In view of the foregoing, it is the main object of this invention to provide a magnetic follower arrangement for a rotameter which includes a simple correction expedient adapted to bring about a linear relationship between the flow rate and the output indication independently of the adjustment of zero and span whereby operation of the correction means does not alter the zero and span settings.

More particularly, it is an object of this invention to provide a rotameter system in which the vertical movement of a float in a variable area flow tube is converted by a magnetic follower into rotary motion for operating a pointer along a scale, the follower being compensated to effect a linear relationship between flow rate and the pointer movement.

A significant feature of the invention is that by vertical adjustment and by lateral adjustment of the follower mechanism and by a variable mass moment, one is able to effect independent adjustments of zero, span and linearity.

Briefly stated, these objects are attained in a rotameter system adapted to produce an output indication that is linearly proportional to flow, the system being constituted by a primary element which is a variable area flowmeter including a float and a bar magnet coupled thereto and a secondary element which is a magnetic follower responsive to the position of the flowmeter float to produce an output indication.

The secondary element comprises a rotatable follower magnet magnetically coupled to the bar magnet within the primary element and a pointer mounted on the shaft of the follower magnet. The vertical position of the follower assembly relative to the bar magnet and the horizontal spacing therebetween are adjustable to provide a linear relationship between the lift of the bar magnet and the rotation of the follower magnet within a desired span whereby the pointer is caused to sweep a scale from its zero to its maximum point.

To compensate for the hydraulic flow characteristic, without affecting the zero and span adjustments, a mass is eccentrically mounted on the shaft of the follower, the position of the mass relative to the axis of the shaft being adjustable to produce a desired moment.

OUTLINE OF DRAWINGS

For a better understanding of the invention as well as other objects and further features thereof, reference is made to the following detailed description to be read in conjunction with the accompanying drawings, wherein:

FIG. 1 is a schematic drawing of a rotameter system in accordance with the invention;

FIG. 2 is a section taken through the follower assembly included in the system;

FIG. 3A, 3B and 3C illustrates the effect of the eccentrically mounted mass on the pointer at three different pointer positions;

FIG. 4 is a graph showing the relationship between the lift of the float in the rotameter and flow rate; and FIG. 5 is a graph showing the relationship between the lift of the float and follower rotation.

DESCRIPTION OF INVENTION

Referring now to FIG. 1, there is shown a rotameter system in accordance with the invention, the main elements of which are a rotameter primary, generally designated by numeral 10, and a secondary element in the form of a magnetic follower 11. The system operates on the variable area principle to sense and indicate the instantaneous flow rate of fluid passing through the rotameter.

Rotameter 10 includes a downwardly-tapered meter tube 12 which may be formed of transparent or opaque material and a float 13 which moves up and down the tube. The variable area meter is provided with the usual pipe fittings (not shown) to admit the fluid to be measured into the lower end of the tube and to discharge this fluid from the upper end thereof.

Metering float 13 is provided with a guided extension rod 14 which extends upwardly therefrom and passes out of the top end of the flow tube. Attached to the free end of rod 14 is a vertically-oriented bar magnet 15 which is caused to move axially along a vertical axis Z in accordance with the rise and fall of the float. For purposes of illustration, the polarization of this bar magnet is such that North is at the upper end and South at the lower end. While the drawing shows bar magnet 15 outside of flow tube 12, in practice the arrangement may be such as to place this magnet within the tube.

Associated with bar magnet 15 is a follower assembly including a disc or wheel-shaped follower magnet 16 mounted at one end of a shaft 17 to whose other end is attached a pointer 18. Pointer 18 is aligned in parallel relation to the magnetic axis of the follower and is movable with respect to a scale 19 (0 to 100%). A mass 20 is supported on a threaded rod 21 coupled to shaft 17 and extending laterally therefrom at an angle of 90° with respect to the pointer, whereby the mass is eccentrically mounted relative to the axis of the shaft, the position of the mass on the rod being adjustable.

The actual structure of the follower assembly is illustrated in FIG. 2, where it will be seen that follower magnet 16 is received within the center well 22 of a non-magnetic housing 23. Shaft 17 is supported by bearings 24 and 25 mounted on a frame 26. Pointer 18 attached to the end of shaft 17 is movable with respect to a scale formed on dial plate 27, the pointer and scale being protected by a transparent cover 28 which is sealed onto housing 23.

Referring again to FIG. 1, it will be seen that disc-shaped follower magnet 16 is so polarized whereby its polar axis is vertical in the position shown with the poles of the follower being equally attracted toward the opposite poles of the primary float magnet 15. Hence the South pole of follower magnet 16 is upward and the magnets are relatively parallel to each other under the influence of their combined fields.

The attraction between the opposing poles of the bar magnet 15 and the follower magnet 16 provides a magnetic coupling therebetween so that when the bar magnet moves axially in the downward direction along axis Z, follower magnet 16 is caused to turn in the counter-clockwise direction to swing pointer 18 toward zero on the scale, and when bar magnet 15 moves upwardly, follower magnet 16 is caused to turn in the clockwise direction to swing pointer 18 toward 100% on the scale. While the scale is shown with indication in terms of percentage, in practice the scale may also be calibrated in terms of flow rate.

In FIG. 1, the float lies at its 50% lift position, with the follower assembly being statically balanced. In order for pointer 18 to register with the 50% position on its associated scale when float 13 is at its 50% lift position, the center of rotation of follower magnet 16 must be aligned with the midpoint of the magnet at the point of intersection between the vertical Z axis passing through bar magnet 15 and the orthogonal horizontal axes X and Y. The follower assembly is placed in its proper elevation relative to the bar magnet by raising or lowering the assembly in the Z direction. The mechanical means for this purpose are conventional and are therefore not illustrated.

The radial line between the point of intersection of axes X, Y and Z in the bar magnet and the center of rotation of follower magnet 16 is represented by symbol $r$. Only one location on radius $r$ will produce a 180° rotation corresponding to a given lift (L) with a substantially linear relationship. A horizontal setting of the follower assembly in the $r$ or X direction is therefore used to adjust the span of the follower assembly. The zero position will align by symmetry. Hence the two adjustments in the Z and X or $r$ direction provide a linear relationship between float lift and follower rotation.

The actual hydraulic characteristic of the rotameter primary is illustrated by curve I in FIG. 4 where it will be seen that the curve has a bowed formation. The ideal relationship between flow rate and float lift is illustrated in curve II which is perfectly linear. Thus while the actual curve I between the zero and maximum float lift position starts at zero and ends at the same point as the ideal curve II, because of the bow formation of the actual curve, the departure from linearity is greatest at 50%.

To compensate for this characteristic bow, the moment of mass 20 on the shaft of the follower is adjusted to impart to the curve representing the relationship between float lift and follower rotation an identical bow formation as shown by curve I in FIG. 5. In FIG. 5, curve II represents the linear relationship between float lift and follower rotation in the absence of the mass moment.

The reason the mass moment effects this correction will be evident from FIGS. 3A, 3B and 3C. When, as shown in FIG. 3A, pointer 18 is at 0 on scale 19, mass 20 is directly below the shaft axis 17, and the center of the mass lies on the vertical line with the vertical force of gravity so that the mass has no effect. When the pointer is at 100%, the mass is now directly above shaft axis 17 and the center of the mass is again in line with the vertical force of gravity so that the mass has no effect.

But when the center of the mass, as shown in FIG. 3B, is displaced from the vertical line passing through axis 17, a moment is produced which is maximum at the 50% pointer position when the center of the mass lies in a plane at right angles to the vertical line passing through axis 17, the moment being progressively reduced as the pointer moves below or above the 50% position. The moment is varied by adjusting the distance between the center of the mass on rod 21 and axis 17.

While there has been shown and described a preferred embodiment of linearizing means for variable area flowmeter, it will be appreciated that many changes and modifications may be made therein without, however, departing from the essential spirit thereof. Thus the invention is applicable to any system wherein a lift can be linearly coupled to an output indicating or transmitting mechanism and where the measured variable has an essentially bowed characteristic with respect to its midpoint of lift, such that:

$$y = ml - d \frac{\sin \pi l}{l(100)}$$

where:
y = measured variable
m = slope of ideal linear characteristic
l = lift of primary movable element
l(100) = lift at maximum vertical position
d = deviation of characteristic from ideal straight line at 50% position of lift.

The above equation could also define flow from an open channel primary device, a liquid level or density device, etc.

I claim:
1. A rotameter system for indicating the flow rate of a fluid, said system comprising:
    A. a primary element including a variable area flow tube through which is flowable the fluid to be measured and having a float and a bar magnet mechanically coupled to the float which is axially movable therewith along a vertical axis, said float being lifted or lowered in the tube as a function of flow rate in accordance with a non-linear hydraulic characteristic curve; and
    B. a secondary element external to the variable area tube and including a rotatable follower magnet mounted on a shaft and positioned relative to the bar magnet whereby the axial movement of the bar magnet results in rotation of the follower magnet to a degree determined by the direction and extent of axial movement, and a mass eccentrically mounted on said shaft at a position relative to the axis thereof to produce a moment which compensates for said hydraulic characteristic curve whereby said rotation is linearly related to flow rate.

2. A system as set forth in claim 1, further including a pointer attached to said shaft and movable along a scale.

3. A system as set forth in claim 1, wherein said mass is mounted on and shiftable along a rod extending laterally from said shaft whereby the mass position is adjustable.

4. A system as set forth in claim 1, including a pointer mounted on said shaft at right angles to the axis of said mass.

5. In a system in which a variable is measured by an element which is lifted and lowered in a range extending from a zero to a maximum position, the relationship between the magnitude of the variable and the position of the element having essentially a bowed characteristic curve, said system comprising:
    A. a primary element including an axially movable bar magnet which is lifted or lowered in accordance with said bowed characteristic curve,
    B. a secondary element incuding a rotatable follower magnet mounted on a shaft and positioned relative to the bar magnet whereby the axial movement of the bar magnet results in rotation of the follower magnet to a degree determined by the direction and extent of axial movement, and a mass eccentrically mounted on said shaft at a position relative to the axis thereof to produce a moment which compensates for said bowed characteristic, whereby said rotation acquires a linear characteristic with respect to the measured variable.

* * * * *